UNITED STATES PATENT OFFICE.

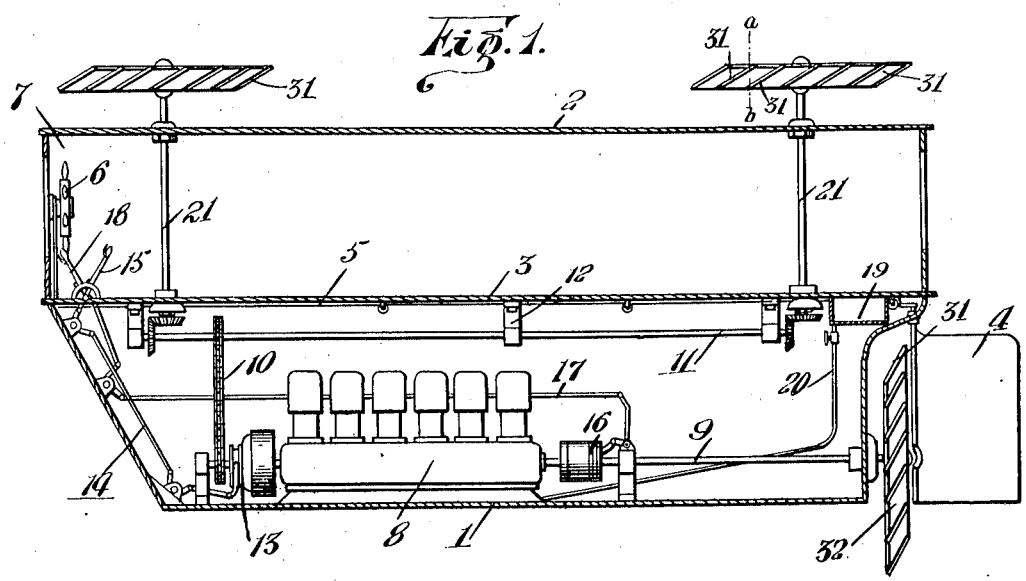
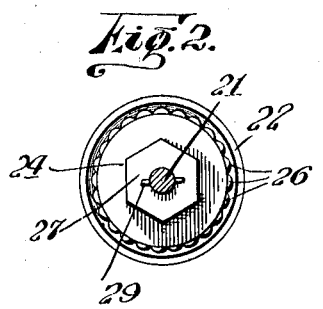
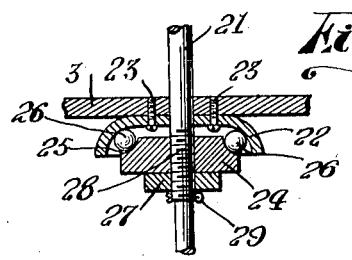
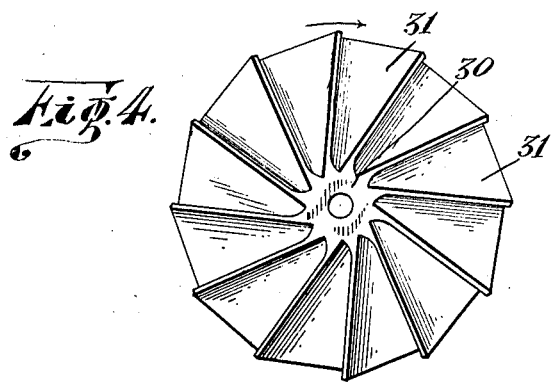

WILLIAM E. MORRISON, OF LA FAYETTE, INDIANA.

AIRSHIP.

970,532.

Specification of Letters Patent. Patented Sept. 20, 1910.

Application filed January 29, 1910. Serial No. 540,868.

*To all whom it may concern:*

Be it known that I, WILLIAM E. MORRISON, a citizen of the United States, residing at La Fayette, in the county of Tippecanoe and State of Indiana, have invented certain new and useful Improvements in Airships, of which the following is a specification.

This invention relates to air ships, and one of the principal objects of the same is to provide improved means for raising the air ship and for propelling it through the air.

Another object of the invention is to provide a propeller wheel of simple construction, which will be strong, durable and efficient for its purpose and which will have an increased holding power.

Still another object of the invention is to provide efficient means for mounting the shafts of the propeller wheel and of the ascension wheels.

These and other objects may be attained by means of the construction illustrated in the accompanying drawings in which, Figure 1 is a longitudinal sectional view through the air ship provided with ascension wheels and a propeller wheel made in accordance with my invention. Fig. 2 is a bottom plan view of one of the ball bearings for the shafts. Fig. 3 is a vertical sectional view of said ball bearing. Fig. 4 is a plan view of one of the propeller or ascension wheels.

Referring to the drawing the numeral 1 designates the bottom of the air ship, 2 is the top and 3 is the interior flooring. The rudder 4 is operated by means of wires 5 extending to a steering wheel 6 in the pilot house 7.
A suitable electric or other engine 8 is mounted in the space underneath the floor 3, and the propeller shaft 9 is provided with a sprocket wheel, upon which a drive chain 10 is mounted, said drive chain passing around a similar sprocket wheel on a countershaft 11 journaled in hangers 12 underneath the floor 3.

A suitable clutch 13 is operated by means of connecting rods 14 leading to a lever 15 in the pilot house, while a similar clutch 16 is operated by means of connecting rods 17 leading to a lever 18 for throwing into and out of operation the propeller wheel.

If a gasolene engine is used a tank 19 is secured under the floor 3 and is provided with a feed pipe 20 leading to the engine 8.

The ascension shafts 21 are mounted vertically in the top 2 and floor 3, said shafts each being provided with a ball bearing comprising a dome-shaped raceway 22 secured by means of screws 23 to the floor. A bearing member 24 is loosely fitted upon the shaft 21 and is provided with a circular groove 25, in which are seated a series of bearing balls 26 to reduce the friction. For holding the bearing member 24 in place a nut 27 is mounted upon the shaft 21 and is adjustable upon the screw threads 28, said nut 27 being held from detachment by means of a cotter pin 29, as shown in Fig. 3.

The propeller wheel and the ascension wheels are substantially identical in form, said wheels each comprising a hub 30 having a series of flat blades 31 extending tangentially from the hub, said blades being of equal width from the hub to their outer ends. These blades extend at an angle from the hub 30 to provide intermediate air spaces 32 between the blades 31. These wheels when viewed in plan present what would appear to be an unbroken surface to the wind, but owing to the angular arrangement of the blades there is a space between each pair of blades to permit the air to pass through.

From the foregoing it will be obvious that an air ship provided with propeller wheels and ascension wheels made in accordance with my invention, will operate efficiently even in a strong current of air.

Upon reference to Fig. 1 it will be seen that a line drawn through two adjacent blades 31 on the line *a—b* will intersect both blades owing to the fact that one blade extends beyond the edge of the next adjacent blade.

Having thus fully described the invention what is claimed as new is:

1. A propeller wheel for air ships comprising a hub, a series of blades of equal width from end to end projecting tangentially from said hub, said blades at their inner ends extending entirely across the hub at an angle to the axis of said hub and said blades being spaced apart to form intermediate air spaces, and each blade extending beyond the next adjacent blade to present an unbroken surface when viewed in plan.

2. An ascension wheel for air ships comprising a hub, a series of blades of equal width from end to end projecting tangentially from said hub, said blades at their inner ends extending entirely across the hub at an angle to the axis of said hub and said blades being spaced apart to form intermediate air spaces, and each blade extending beyond the next adjacent blade to present an unbroken surface when viewed in plan, means for mounting said wheel in an air ship, and means for rotating said wheel.

In testimony whereof I affix my signature in presence of two witnesses.

WILLIAM E. MORRISON.

Witnesses:
WILLARD G. SLAGLE,
C. G. STOCKER.